(12) United States Patent
Miller

(10) Patent No.: US 7,813,500 B2
(45) Date of Patent: Oct. 12, 2010

(54) METHOD AND APPARATUS FOR RINGING

(75) Inventor: Merle L. Miller, Austin, TX (US)

(73) Assignee: Zarlink Semiconductor (U.S.) Inc., Ontario (CA)

( * ) Notice: Subject to any disclaimer, the term of this patent is extended or adjusted under 35 U.S.C. 154(b) by 2683 days.

(21) Appl. No.: 09/752,167

(22) Filed: Dec. 29, 2000

(65) Prior Publication Data

US 2002/0085706 A1    Jul. 4, 2002

(51) Int. Cl.
*H04M 1/00* (2006.01)
(52) U.S. Cl. .................................. 379/413.01
(58) Field of Classification Search ............... 379/377, 379/399.01, 399.02, 412, 382, 413.01
See application file for complete search history.

(56) References Cited

U.S. PATENT DOCUMENTS

| | | | | |
|---|---|---|---|---|
| 5,636,273 | A * | 6/1997 | Schopfer et al. | 379/382 |
| 5,809,109 | A * | 9/1998 | Moyal et al. | 379/412 |
| 5,878,133 | A | 3/1999 | Zhou et al. | |
| 5,889,856 | A * | 3/1999 | O'Toole et al. | 379/399.02 |
| 5,926,544 | A * | 7/1999 | Zhou | 379/413 |
| 6,094,480 | A * | 7/2000 | Vaclavik et al. | 379/377 |
| 6,178,241 | B1 * | 1/2001 | Zhou | 379/382 |
| 6,219,417 | B1 * | 4/2001 | Zhou | 379/377 |
| 6,728,370 | B1 * | 4/2004 | Anderson et al. | 379/398 |
| 6,735,302 | B1 * | 5/2004 | Caine et al. | 379/405 |
| 6,778,663 | B1 * | 8/2004 | Schopfer | 379/377 |
| 6,934,384 | B1 * | 8/2005 | Hein et al. | 379/399.02 |

* cited by examiner

*Primary Examiner*—Alexander Jamal
(74) *Attorney, Agent, or Firm*—Williams, Morgan & Amerson, P.C.

(57) ABSTRACT

A method and apparatus is provided for ring-trip detection in a line card having an analog-to-digital converter for processing voice signals. The method includes receiving a ringing control signal, transmitting a ringing signal to a subscriber line in response to the ringing control signal, and receiving a portion of the ringing signal from the subscriber line. The method includes converting the portion of the ringing signal to a digital signal using the analog-to-digital converter, and providing a ring-trip indication in response to the digital signal. The apparatus includes first circuitry capable of processing a voice signal, the circuitry including a analog-to-digital converter for processing the voice signal. The apparatus includes a ringing generator, second circuitry, and ring-trip detection logic. The generator is capable providing a ringing signal to a subscriber line in response to receiving a ringing control signal. The second circuitry is capable of delivering the portion of the ringing signal to the analog-to-digital converter of the first circuitry, wherein the analog-to-digital converts the portion of the ringing signal to a digital signal. The ring-trip detection logic is capable of providing a ring-trip indication in response to the digital signal.

8 Claims, 4 Drawing Sheets

METHOD AND APPARATUS FOR RINGING

BACKGROUND OF THE INVENTION

1. Field of the Invention

This invention relates generally to telecommunications, and, more particularly, to a method and apparatus for ringing a telephonic device.

2. Description of the Related Art

In communications systems, particularly telephony, it is a common practice to transmit signals between a subscriber station and a central switching office via a two-wire bi-directional communication channel. A line card generally connects the subscriber station to the central switching office through a subscriber line. At the subscriber end, a telephonic device may be employed to establish communication with a remote user using the subscriber line. The combination of the telephonic device and the subscriber line is commonly referred to as a subscriber loop.

A line card generally includes at least one subscriber line interface circuit (SLIC) as well as a subscriber line audio-processing circuit (SLAC). The SLIC interfaces with the subscriber loop, and the SLAC interfaces with the SLIC. The SLIC and the SLAC carry out the well-known BORSCHT (Battery feed, Overvoltage protection, Ringing, Supervision, Coding, Hybrid, and Test) functions.

Typically, when an end user initiates a call, the line card provides a ringing AC ringing signal and, often, a DC bias signal, to the subscriber loop to ring the telephonic device. In the United States, the AC ringing signal generally varies from a 16 Hz to 66⅔ Hz, although a 20 Hz signal is commonly used. Other countries may employ a ringing signal of a different frequency than that of the ringing signal employed in the United States. For example, in European countries, the ringing signal is 25 Hz. The ringing signal can either be internally or externally generated.

The ringing signals generally tend to be larger signals than the signals utilized for normal voice operations (i.e., during non-ringing mode). For example, during non-ringing mode, the voltage of the signals is generally no more than 50 volts DC, when no current is flowing, In contrast, the ringing signal may be a 80 volt-rms signal that is capable of saturating the voice components of the line card.

The present invention is directed to overcoming, or at least reducing the effects of, one or more of the problems set forth above.

SUMMARY OF THE INVENTION

In one aspect of the present invention, a method is provided for ring-trip detection in a line card having an analog-to-digital converter for processing voice signals. The method includes receiving a ringing control signal, transmitting a ringing signal to a subscriber line in response to the ringing control signal, and receiving a portion of the ringing signal from the subscriber line. The method includes converting the portion of the ringing signal to a digital signal using the analog-to-digital converter, and providing a ring-trip indication in response to the digital signal.

In another aspect of the present invention, an apparatus is provided. The apparatus includes first circuitry capable of processing a voice signal, the circuitry including an analog-to-digital converter for processing the voice signal. The apparatus further includes a ringing generator, second circuitry, and ring-trip detection logic. The generator is capable of providing a ringing signal to a subscriber line in response to receiving a ringing control signal. The second circuitry is capable of delivering the portion of the ringing signal to the analog-to-digital converter of the first circuitry, wherein the analog-to-digital converts the portion of the ringing signal to a digital signal. The ring-trip detection logic is capable of providing a ring-trip indication in response to the digital signal.

BRIEF DESCRIPTION OF THE DRAWINGS

The invention may be understood by reference to the following description taken in conjunction with the accompanying drawings, in which like reference numerals identify like elements, and in which.

Figure 1:
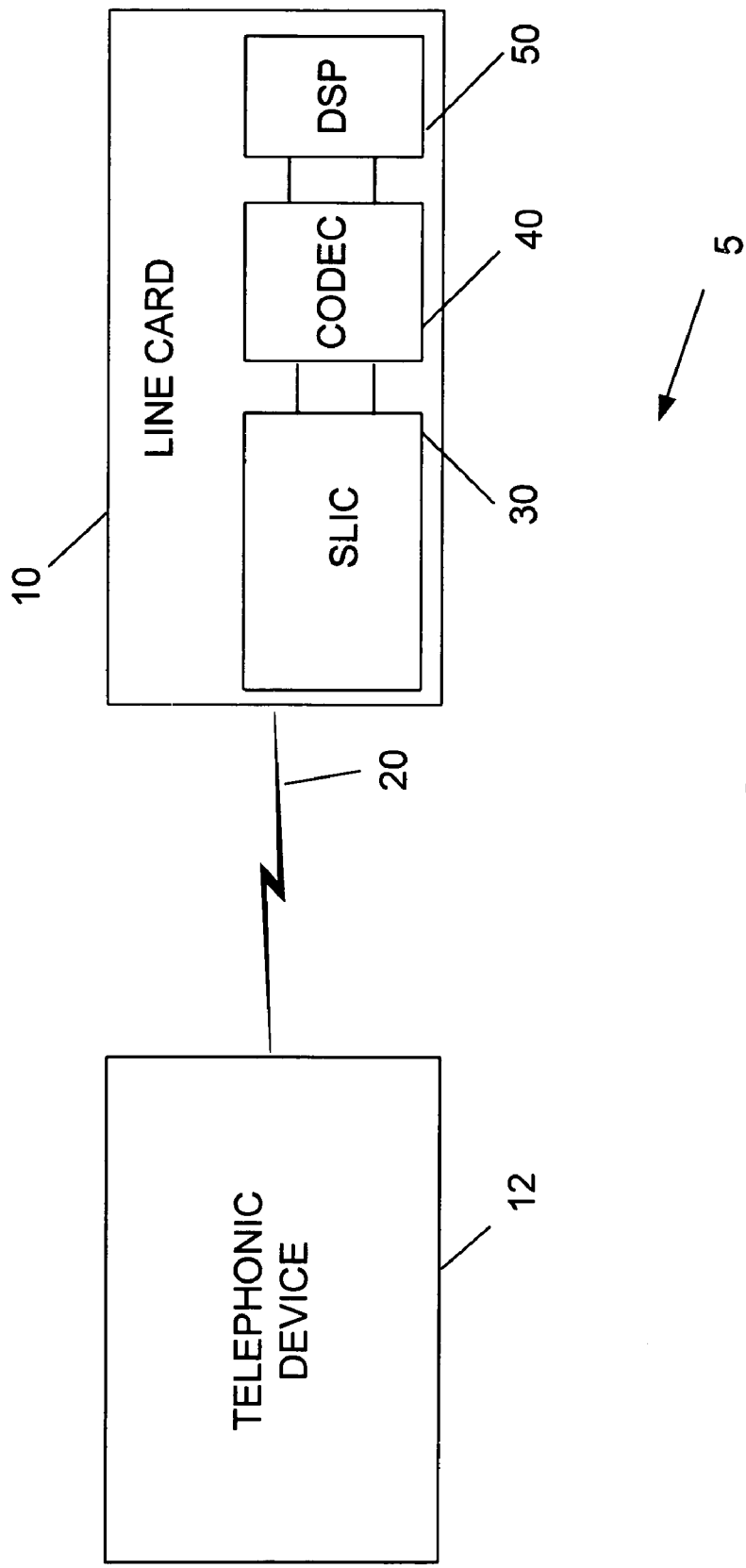
FIG. 1 illustrates a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring first to FIG. 1, a simplified block diagram of a communications system 5 in accordance with the present invention is provided. The communications system 5 includes a line card 10 that interfaces with a telephonic device 12 over a subscriber line 20. In an actual implementation, the line card 10 interfaces with a plurality of subscriber lines 20, but for clarity and ease of illustration, only one is shown. In accordance with the present invention, the line card 10 is capable of providing a reliable method of ring-trip detection and AC fault detection based on a received ringing signal and fault-detection signal, respectively. Additionally, the line card 10 may perform other functions reliably, particularly functions that rely on power calculation.

A subscriber line interface circuit (SLIC) 30 is coupled to the subscriber line 20. Hereinafter, signals received by the line card 10 over the subscriber line 20 are referred to as upstream signals, and signals transmitted by the line card 10 on the subscriber line 20 are referred to as downstream signals. The SLIC 30 supplies an analog upstream signal to a coder/decoder (CODEC) 40. The CODEC 40 receives the analog upstream signal from the SLIC 30 and generates a digital upstream signal that is subsequently passed to a digital signal processor 50. The DSP 50 also provides a digital signal for eventual transmission on the subscriber line 20. The CODEC 40 receives the digital signal, converts it to an analog signal, and provides the analog signal to the SLIC 30, which sends the analog signal over the subscriber line 20.

In the illustrated embodiment, the line card 10, in addition to supporting plain old telephone service (POTS), is adapted to implement an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (AD SL) Metallic Interface." The SLIC 30 of the line card 10 is capable of performing a variety of functions, such as battery feed, overload protection, polarity reversal, on-hook transmission, and current limiting. Only relevant portions of the SLIC 30, CODEC 40, and DSP 50 are described herein, although those of ordinary skill in the art will appreciate that these devices may perform other functions that are not described in this disclosure.

The telephonic device 12 may comprise a telephone or any other device capable of providing a communication link between at least two users. In one embodiment, the telephonic device 12 may be one of a variety of available conventional telephones, such as wired telephones and similar devices. In an alternative embodiment, the telephonic device 12 may be any device capable of performing a substantially equivalent function of a conventional telephone, which may include, but is not limited to, transmitting and/or receiving voice and data signals. Examples of the telephonic device 12 include a data processing system (DPS) utilizing a modem to perform telephony, a television phone, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN).

Figure 2:
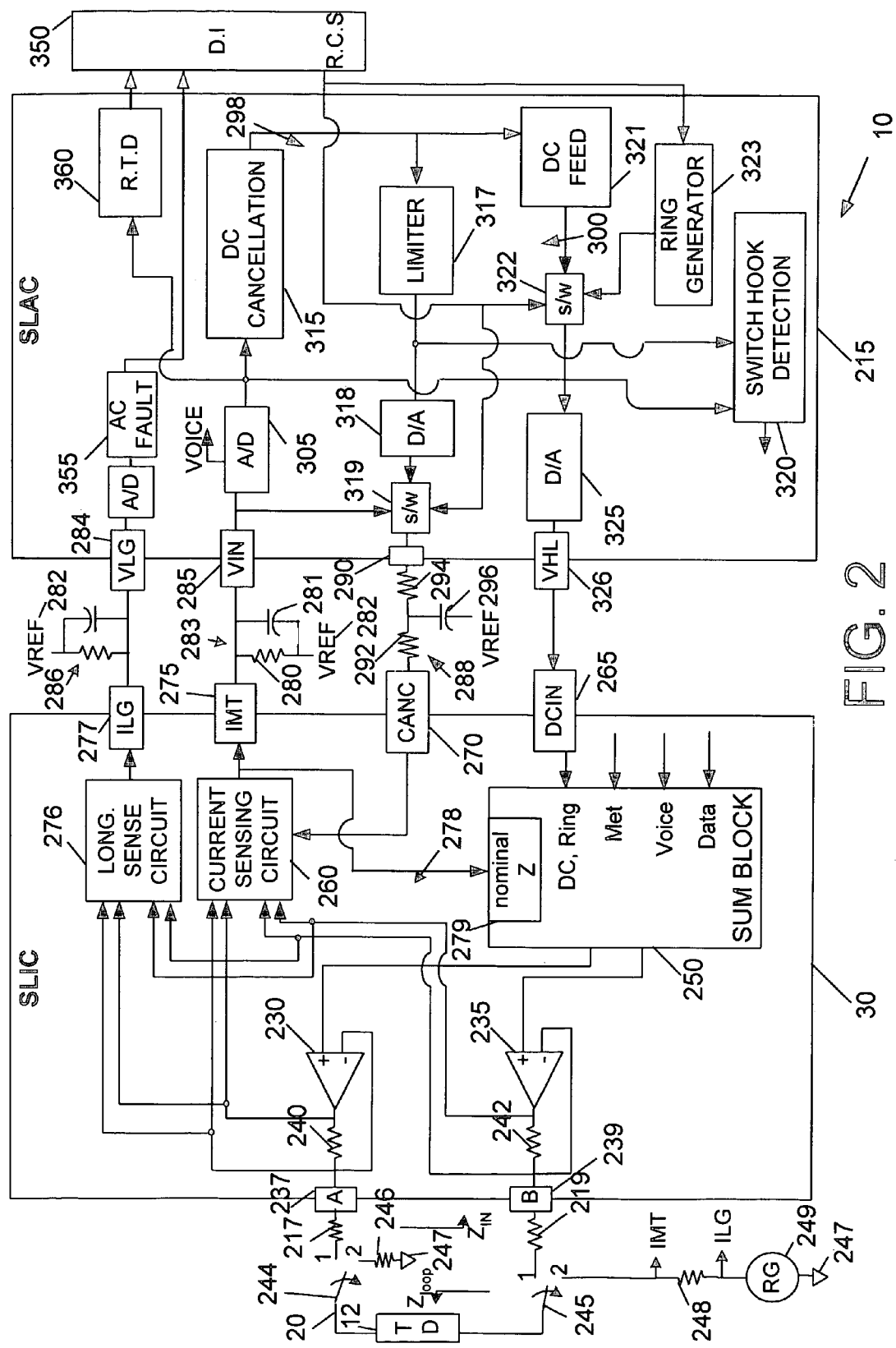
FIG. 2 depicts a block diagram of an embodiment of a line card in accordance with the present invention that can be implemented in the communications system of FIG. 1.

FIG. 2 illustrates one embodiment of the line card 10 in accordance with the present invention. Specifically, the line card 10 includes the SLIC 30, which, in the illustrated embodiment, is a voltage-feed SLIC. The line card 10 also includes the CODEC/DSP 40, 50, which in the illustrated embodiment are shown as a subscriber line audio-process circuit (SLAC) 215 that integrates the functions of both the CODEC and DSP 40, 50. The line card 10 may be located at a central office or a remote location somewhere between the central office and the telephonic device 12 (see FIG. 1). The line card 10 interfaces with the telephonic device 12 through tip and ring terminals 237, 239 at the SLIC 30. The combination of the telephone device 12 and the subscriber line 20 is generally referred to as a subscriber loop.

The impedance of the subscriber line 20 is herein denoted as $Z_{LOOP}$, and impedance seen by an incoming signal from the subscriber line 20 is hereinafter referred to as $Z_{IN}$. The value of $Z_{LOOP}$, which is determined by individual telephone authorities in various countries, may be in the range of 600-900 ohms for the POTS band and in the range of 100-135 ohms for the xDSL band. The SLIC 30 is adapted to be coupled to first and second resistors 217, 219, which are utilized to define the input impedance.

The line card 10, which may be capable of supporting a plurality of subscribers lines 20, performs, among other things, two fundamental functions: DC loop supervision and DC feed. The purpose of DC feed is to supply enough power to the telephone device 12 at the customer end. The purpose of DC loop supervision is to detect changes in DC load, such as on-hook events, off-hook events and rotary dialing, or any other event that causes the DC load to change. In the interest of clarity and to avoid obscuring the invention, only that portion of the line card 10 that is helpful to an understanding of the invention is illustrated.

The voltage-feed SLIC 30 is a high voltage bipolar SLIC that drives voltages to the subscriber line 20 and senses current flow in the subscriber line 20. The SLIC 30 includes first and second differential line drivers 230, 235 that interface with the subscriber line 20 via tip and ring terminals 237, 239. The tip terminal 237 is coupled to a first terminal of a first sensing resistor ($R_{ab}$) 240 and to an inverting terminal of the first line driver 230. A second terminal of the first sensing resistor 240 is coupled to an output terminal of the first line driver 230. The ring terminal 239 is coupled to a first terminal of a second sensing resistor ($R_{bd}$) 242 and to an inverting terminal of the second line driver 235. A second terminal of the second sensing resistor 242 is coupled to an output terminal of the second line driver 235.

The line card 10 is adapted to provide external ringing. FIG. 2 illustrates a first switch 244 and second switch 245 for toggling between internal ringing and external ringing. During external ringing, the first and second switches 244, 245 are in position 2, and during normal operation or internal ringing, the switches 244, 245 are in position 1. When in position 2, the first switch 244 is coupled to a first terminal of a resistor 246, which has a second terminal coupled to a ground node 247. The second switch in position 2 is coupled to a first terminal of a resistor 248, which has a second terminal coupled to a first terminal of an external ringing generator 249. A second terminal of the external ringing generator 249 is coupled to the ground node 247. For internal ringing, the switches 244, 245 are in position 1, and the line card 10 internally generates a ringing signal and provides it to the subscriber loop 20.

The SLIC 30 includes a sum block 250 and a current-sensing circuit 260. The sum block 250 includes a first output terminal coupled to a non-inverting terminal of the first line driver 230, and a second (inverted) output terminal coupled to a non-inverting terminal of the second line driver 235. The sum block 250 is capable of receiving a DC feed signal (as well as ringing signals) from a DCIN terminal 265, a voice signal, a metering signal, and a data signal and is capable of adding one or more of the received signals and providing it to the first and second line drivers 230, 235. The signals into the SUM block 250 may be subjected to different levels of gain for optimal performance. The signal from the DCIN terminal 265 is low-pass filtered.

The current-sensing circuit 260 produces a current proportional to the current through the current sensing resistors 240, 242, subtracts a current proportional to a current from a cancellation terminal (CANC) 270, and provides the resulting (metallic) current to an IMT terminal 275 of the SLIC 30. Although not so limited, in the instant embodiment, the constant of proportionality for the current from the cancellation terminal (CANC) 270 is unity, and the constant of proportionality for the metallic line current is 0.001. Those skilled in the art will appreciate that only those portions of the SLIC 30 deemed relevant to the invention are disclosed herein. The SLIC 30 may employ other circuitry that is not illustrated in FIG. 2.

The SLIC 30 includes a longitudinal sensing circuit 276 that provides a current proportional to the current through the current sensing resistors 240, 242. Specifically, the longitudinal sensing circuit 276 adds the current flowing through the current sensing resistors 240, 242, divides the sum by two, and provides the resulting longitudinal current to an ILG terminal 277 of the SLIC 30. Although not so limited, in the instant embodiment, the constant of proportionality for the longitudinal line current is 0.001.

The SLIC 30 includes a first impedance matching loop 278 that adjusts a nominal value of the input impedance ($Z_{IN}$) to substantially match the impedance of the subscriber line 20. The first impedance matching loop 278 includes a nominal Z block 279 that receives the output signal of the current sensing circuit and provides a selected amount of "fixed" gain and delay to adjust a nominal value of the input impedance, $Z_{IN}$. In the illustrated embodiment, the nominal Z block 279 sets the nominal value of the input impedance to a fixed value of 900 ohms, which includes the resistance provided by resistors 217, 219, 240 and 242.

The SLIC 30 is connected to the SLAC 215 as well as to an external resistor 280, as well as a capacitor 281. In the illustrated embodiment, the resistor 280 is 100,000 ohms. A first terminal of the resistor 280 is coupled to the IMT terminal 275 of the SLIC 30, as well as to the VIN terminal 285 of the SLAC 215. A second terminal of the resistor 280 is coupled to a reference voltage node 282, as well as to a terminal of the capacitor 281. In one embodiment, the reference voltage 282 is in the range of about 1.4 volts. The external resistor 280 and the capacitor 281 form a single-pole low pass filter 283 that is capable of filtering at least a portion, if not all, of the signals above the voice band, such as data signals and metering signal. The external resistor 280 and the capacitor 281 convert the current flowing from the IMT terminal 275 to a proportional voltage signal for the SLAC 215. Although not necessary, the resistor 280 is external in the illustrated embodiment because in some embodiments it may be useful for the drive value of the resistor to be relatively precise and because each line card 10 may require different values.

The ILG terminal 277 of the SLIC 30 is connected to a VLG terminal 284 of the SLAC 215 as well as to a filter 286. The impedance of the filter 286 converts the current flowing from the ILG terminal 277 to a proportional voltage signal for the SLAC 215. The filter 286 removes undesirable frequencies such as those above the voice band.

A discrete network 288 couples the SLIC 30 to the SLAC 215 via the CANC terminals 270, 290. The discrete network 288 includes a first and second resistor 292, 294 and a capacitor 296. A first terminal of the first resistor 292 is coupled to the CANC terminal 270 of the SLIC 30 and a second terminal of the first resistor 292 is coupled to a first terminal of the second resistor 294. The second terminal of the second resistor 294 is coupled to the CANC terminal 290 of the SLAC 215. The capacitor 296 is coupled between the second terminal of the first resistor 292 and the reference voltage node 296. The discrete network 288 acts as a low pass filter and converts the voltage output signal from the SLAC 215 to a current and provides it to the SLIC 30.

The SLAC 215 interfaces with the telephonic device 12 through the SLIC 30 and over the subscriber line 20. The SLAC 215 includes two feedback loops: a DC cancellation loop 298 and a DC feed loop 300. In the illustrated embodiment, the two loops 298, 300 are implemented within a digital signal processor (DSP). Only those portions of the SLAC 215 deemed relevant to the instant invention are described herein, albeit the SLAC 215 may perform a variety of other functions that are not illustrated in FIG. 2.

The DC cancellation loop 298 includes an analog-to-digital converter 305, DC cancellation logic 315, a current limiter 317, and a digital-to-analog converter 318, and a switch 319. The switch 319, during a non-ringing mode, allows an output signal of the digital-to-analog converter 318 to pass to the CANC 215 terminal 290 of the SLAC. In contrast, during a ringing mode, and as is described in more detail below, the switch 319 couples the VIN and CANC terminals 285, 290 of the SLAC 215, thereby disengaging the DC cancellation loop 298 from the CANC terminal 290.

In the illustrated embodiment, to reduce hardwire complexity, the voice and DC components of the input signal from the VIN terminal 285 share the same analog-to-digital converter 305. Additionally, the line card 10 employs the analog-to-digital converter 305 for ringing as well as voice processing. The analog-to-digital converter 305 and digital-to-analog converter 318 include a decimator and interpolator, respectively. The analog-to-digital converter 305 in the illustrated embodiment is capable of providing two output signals, the first output signal is sampled at a 4 KHz frequency and provided as a digital signal to the DC cancellation logic 315, as well as to a switch hook detection logic 320. The second output signal of the analog-to-digital converter 305, comprising of voice and/or data (residual) components, is sampled at 32 KHz and provided to a CODEC (not shown). A residual data component may exist at the output of the analog-to-digital converter 305 since the single-pole low pass filter 283 may not remove the entire data signal.

During the non-ringing mode, the DC cancellation logic 315 receives the digital signal from the analog-to-digital converter 305, filters high frequencies, and provides substantially a DC signal. The DC signal is provided as an input to the DC feed logic 321, as well as to the current limiter 317. The output of the current limiter 317 is converted to an analog signal and then provided back to the SLIC 30 via the CANC terminal 270. The output of the current limiter 317 is also provided to the switch hook detection logic 320 for switch hook detection. The current provided to the CANC terminal 270 of the SLIC 30 is used to cancel the DC component of the signal from the current sense circuit 260. Thus, during a "stable" state (i.e., no transients present), the signal at the VIN terminal 285 of the SLAC 215 is essentially DC free.

The DC feed loop 300, in addition to the analog-to-digital converter 305 and DC cancellation logic 315, includes DC feed logic 321, a switch 322, and a digital-to-analog converter 325. In the illustrated embodiment, the digital-to-analog converter 325 may also interpolate. During the non-ringing state, the switch 322 provides an output signal from the DC feed logic 321 to the digital-to-analog converter 325. However, as will be described in more detail below, during the ringing state, the switch 322 disengages the output of the DC feed logic 321, and, instead, provides a ringing signal generated by a ring generator 323 to the digital-to-analog converter 325. The output from the digital-to-analog converter 325 is provided to a DCIN terminal 265 of the SLIC 30 via VHL terminal 326 of the SLAC 215. The DC feed logic 321 is capable of providing high DC voltage to the subscriber loop so that sufficient current (20-60 mA) can be driven through a resistance as high as 2K ohms.

When the DC conditions on the subscriber loop change suddenly, the DC feed logic 321 adapts to the change, thereby allowing normal transmission to continue. Examples of sudden changes in DC conditions include on-hook, off-hook, rotary dialing, and tone signaling. When the telephonic device 12 goes off-hook, the loop impedance drops almost instantly to a value below 2K ohms. In short subscriber loops, the loop impedance may be less than 200 ohms. For the line card 10 to function and transmit information properly, the DC conditions on the subscriber loop should be stabilized quickly, and in some cases, within milliseconds.

Figure 3:
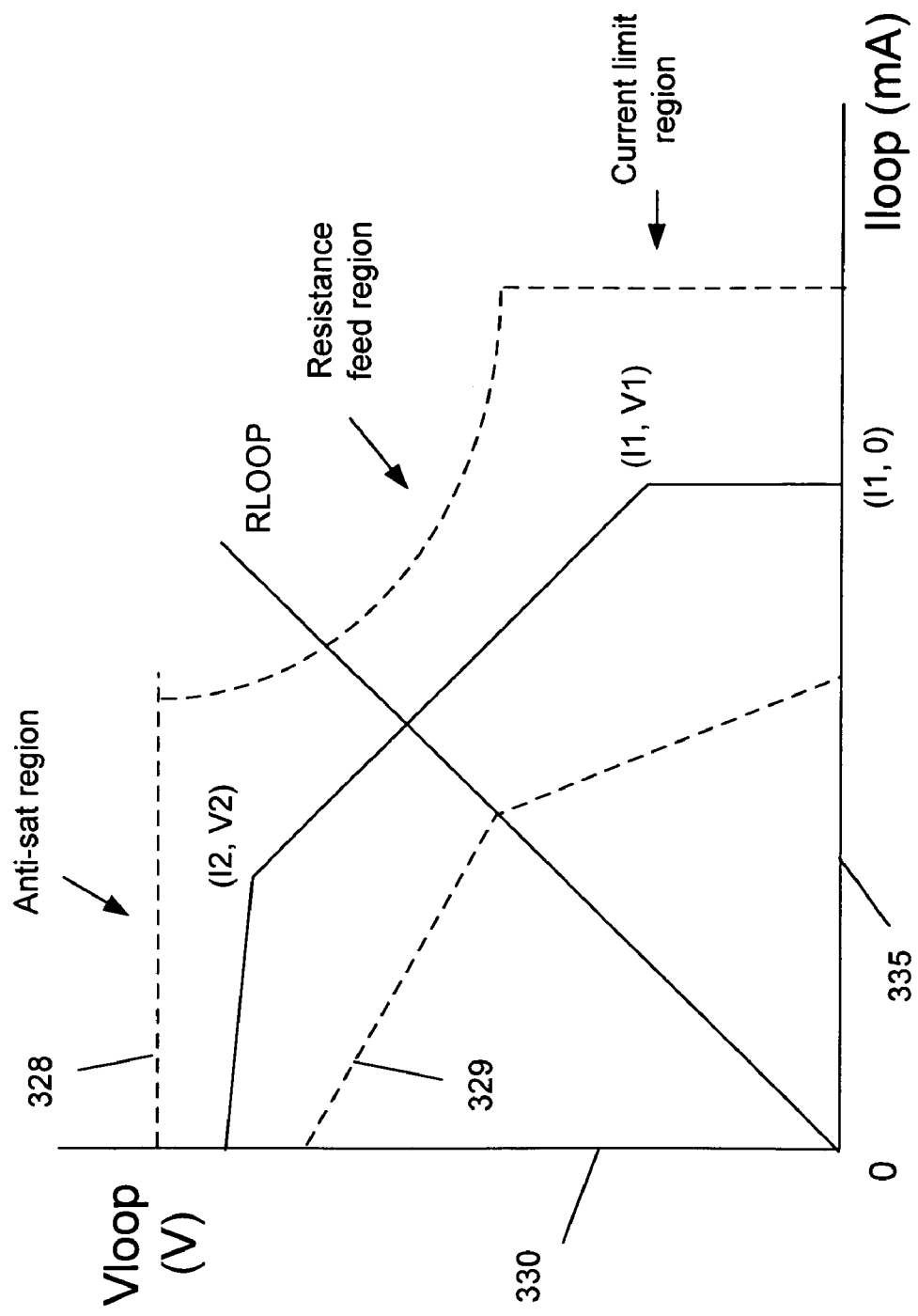
FIG. 3 depicts an exemplary DC feed curve that may be employed by the line card of FIG. 2.

FIG. 3 illustrates an exemplary DC feed curve that may be adapted for use by the DC feed logic 321. A dashed line 328 provides the upper limits for the electrical power, and a dashed line 329 provides the lower limits for the electrical power provided to the subscriber loop. A Y-axis 330 represents voltage, and an X-axis 335 represents current. As can be seen in FIG. 3, although not so limited, the DC feed curve includes an anti-saturation region, a resistance feed region, and a current limit region.

Referring again to FIG. 2, when the line card 10 is in a "stable" state (i.e., no transients), the signal at the VIN terminal 285 of the SLAC 215 comprises primarily a voice signal, although it may include residual metering and data signals that are not removed by the single-pole low pass filter 283. This single-pole low pass filter 283 provides an adequate performance by attenuating the data and metering signals to acceptable levels. Aside from being more cost effective than higher order low-pass filters, the single-pole low pass filter 283 also provides an added advantage in that it does not make the line card 10 unstable.

The line card 10 operates in at least two modes, a non-ringing mode and a ringing mode. A digital interface 350, which includes a processor (not shown), controls the operation mode of the line card 10. For example, when a remote user places a call to the telephonic device 12, the central office instructs the digital interface 350 to ring the telephonic device 12. Accordingly, in response to the request from the central office, the digital interface 350 provides a ring control signal to switches 319, 322, as well as to the ring generator 323. During the ringing mode, the switch 319 couples the VIN and CANC terminals 285, 290 of the SLAC 215, and the switch 322 couples the ring generator 323 to the digital-to-analog converter 325, which then converts the ringing signal into a digital signal before it is provided to the subscriber loop 30. In contrast, during the non-ring mode, when no ringing control signal is provided, the switches 319, 322 connect the respective DC cancellation and DC feed loops 298, 300 to the respective CANC and VHL terminals 290, 326 of the SLAC 215.

In response to receiving the ringing control signal, the ring generator 323 of the line card 10 provides an internal ringing signal to the subscriber loop 20. Thus, the first and second switches 244, 245 are set to position 1. In response to the ringing control signal from the digital interface 350, the switch 319 couples the VIN terminal 285 to the CANC terminal 290 of the SLAC 215, thereby shielding the DC cancellation loop 298 from high voltages and currents commonly associated with ringing signals. Typically, for voice and data operation, the current may reach 60 mA DC, which is a current level that may be cancelled by the DC cancellation loop 298. In contrast, a ringing signal, which commonly comprises a 20 Hz signal along with a DC offset, may reach a peak current of over 100 mA, a level that is too high for the DC cancellation loop 298. Accordingly, connecting the VIN and CANC terminals 285, 290 of the SLAC 215 aids in lowering the current level to the DC cancellation loop 298.

The impedance provided by the discrete network 288 at the CANC terminal 290 of the SLAC 215 is relatively low, approximately 16 to 17 K ohms. So, when the VIN and CANC terminals 285, 290 are shorted, the relatively low impedance of the discrete network 288 lowers the impedance seen at the VIN terminal 285, which is set primarily by the 100,000-ohm resistor 280. This is because adding a high and low impedance in parallel has a net effect of lowering the impedance. As a result of lower impedance, the voltage level present at the VIN terminal 285 during the ringing mode is generally at a lower level. Furthermore, the current sensing circuit 260 of the SLIC 30 aids in further reducing the voltage level at the VIN terminal 285, perhaps by half. This is because the current flowing from the VIN terminal 285 to the CANC terminal 290 is subtracted from the sensed line current in the SLIC 30 by the current sensing circuit 260. By lowering the impedance during the ringing mode, the line card 10 is able to handle currents of higher level, typically up to 130 mA.

In essence, shorting the VIN and CANC terminals 285, 290 allows the line card 10 to toggle between a low-current mode to a high-current mode. The low-current mode is the non-ringing mode where the current level is under about 61 mA. The high-current mode is the ringing mode where currents in may range up to 130 mA. Without the VIN and CANC terminals 285, 290 shorted, the line card 100 can support a current of approximately 61 mA, whereas with the terminals 285, 290 shorted, the line card 10 can handle a current of approximately 130 mA, which is adequate for ringing.

The SLAC 215 includes AC fault detection logic 355 and ring-trip detection logic 365. The ring-trip detection logic 365 is capable of receiving the output signal of the analog-to-digital converter 305 and providing a ring trip indication to the digital interface 350. The ring-trip detection logic 365 compares its input signal against a threshold value. And if the input signal exceeds the threshold value, the ring-trip detection logic 365 indicates so to the digital interface 365. Upon receiving a ring trip indication from the ring-trip detection logic 360, the digital interface 350 terminates the ringing, and the line card thereafter operates in the non-ringing mode until a next ringing signal is transmitted by the digital interface 350. The AC fault detection logic 355 and ring-trip detection logic 360 are shown as functional blocks in FIG. 2 for illustrative purposes only. It should be appreciated that in actual implementation these blocks are implemented in software within the digital signal processor 50 (see FIG. 1).

Figure 4:
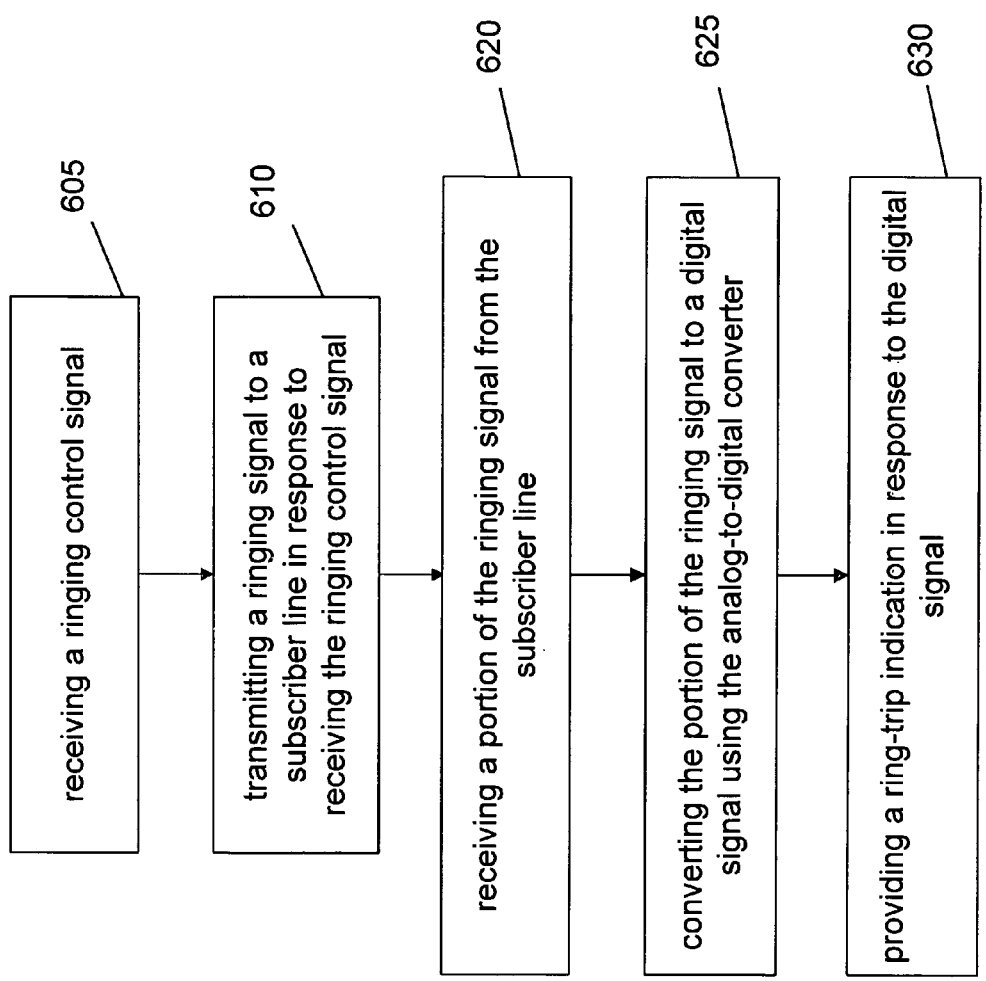
FIG. 4 illustrates an embodiment of a method that may be employed by the line card of FIG. 2.

Referring now to FIG. 4, a method is shown for ring-trip detection in the line card 10 using a common digital-to-analog converter 305 for voice processing as well as ring-trip detection. The method begins at block 605, where the ringing generator 323 receives a ringing control signal from the digital interface 350. In response to the ringing signal, the switch 319 shorts the VIN and CANC terminals 285, 290 of the SLAC 215. Additionally, the switch connects the ringing generator 323 to the digital-to-analog converter 325. At block 610, the ringing generator 323 transmits a ringing signal to the subscriber line 30 in response to receiving the ringing control signal.

At block 620, the line card 10 receives a portion of the ringing signal from the subscriber line 30. The ringing signal is provided to the VIN terminal 285 of the SLAC 215 and then to the digital-to-analog converter 305. At block 625, the analog-to-digital converter 305 converts the received ringing signal from the VIN terminal to a digital signal and provides it to the ring-trip detection logic 360. The instant invention is able to utilize a common analog-to-digital converter for voice processing as well as for ringing. At block 630, the ring-trip detection logic 360 provides a ring-trip indication in response to the digital signal.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus, comprising:

a feedback path having a first node and a second node, the feedback path comprising a current sensing portion, an analog-to-digital converter, a direct current cancellation portion, a current limiter portion, a digital-to-analog converter and a switch, wherein the analog-to-digital converter is adapted to process voice signals, and wherein the first node is coupled to the analog-to-digital converter input and the second node is coupled to the digital-to-analog converter output;

wherein the switch being adapted to couple the first and second nodes of the feedback path in response to receiving a control signal; and a ringing generator for providing a ringing signal to a subscriber line in response to the control signal.

2. The apparatus of claim 1, further including circuitry for: receiving at least a portion of the transmitted ringing signal from the subscriber line; and delivering the portion of the received ringing signal to the first node of the feedback path.

3. The apparatus of claim 2, wherein the analog-to-digital converter of the feedback path converts the received ringing signal to a digital signal.

4. The apparatus of claim 3, further including ring-trip detection logic, wherein the ring-trip detection logic generates a ring-trip detection indication in response to the digital signal.

5. A method, comprising:

processing a signal received over a subscriber line by one or more components in a first path, the first path having a first node and a second node, a current sensing portion, an analog-to-digital converter, a direct current cancellation portion, a current limiter portion, a digital-to-analog converter and a switch, wherein the first node is coupled to the analog-to-digital converter input and the second node is coupled to the digital-to-analog converter output;

receiving a control signal;

coupling the first node and the second node of the first path in response to receiving the control signal; and providing a ringing signal to the subscriber line responsive to the control signal.

6. The method of claim 5, wherein the first path is a voice path, and wherein processing the signal comprises processing a voice signal received over the subscriber line.

7. The method of claim 5, wherein the first path is a loop supervision path, and wherein processing the signal comprises processing a DC signal received over the subscriber line.

8. An apparatus, comprising:

means for processing a signal received over a subscriber line by one or more components in a first path, the first path having a first node and a second node, a current sensing portion, an analog-to-digital converter, a direct current cancellation portion, a current limiter portion, a digital-to-analog converter and a switch, wherein the first node is coupled to the analog-to-digital converter input and the second node is coupled to the digital-to-analog converter output;

means for receiving a control signal;

means for coupling the first node and the second node of the first path in response to receiving the control signal; and means for providing a ringing signal to the subscriber line responsive to the control signal.

* * * * *

UNITED STATES PATENT AND TRADEMARK OFFICE
CERTIFICATE OF CORRECTION

PATENT NO. : 7,813,500 B2
APPLICATION NO. : 09/752167
DATED : October 12, 2010
INVENTOR(S) : Merle L. Miller Page 1 of 1

It is certified that error appears in the above-identified patent and that said Letters Patent is hereby corrected as shown below:

On the Title page of the patent in Item (73)

Assignee: should read, Zarlink Semiconductor (U.S.) Inc.  Location: Austin, (TX)

Signed and Sealed this
Twelfth Day of March, 2013

Teresa Stanek Rea
*Acting Director of the United States Patent and Trademark Office*